UNITED STATES PATENT OFFICE.

CHARLES F. MORSE, OF CLEVELAND, OHIO, ASSIGNOR TO THE INVISIBLE PROCESS CO., OF CLEVELAND, OHIO.

INVISIBLE INK.

1,423,246.                Specification of Letters Patent.         Patented July 18, 1922.

No Drawing.      Application filed November 14, 1921. Serial No. 515,000.

*To all whom it may concern:*

Be it known that I, CHARLES F. MORSE, a citizen of the United States, residing at 7720 Sagimore Ave., Cleveland, in the State of Ohio and Cuyahoga County, have invented a new and useful Improvement in Invisible Ink, of which the following is a specification, the principle of the invention being herein explained and the best mode in which I have contemplated applying that principle, so as to distinguish it from other inventions.

My invention pertains to invisible inks adapted for use on printing presses.

To prepare my novel ink, I take say, two pounds of an aqueous solution of basic ferric sulphate and mix it with about one pound of syrupy phosphoric acid which will ordinarily give the desired fluid consistency. Occasionally, the addition of a little ferric ammonium solution will be helpful.

The resultant product constitutes an ink from which an impression is normally invisible, but which becomes visible when subjected to heat thereby affording an attractive advertising medium by exciting human curiosity regarding the character of the concealed print.

In preparing my ink I take small flakes of ferric sulphate and soak them over night in cold water to find them limp in the morning in a gelatinous mass so that with a little stirring a homogeneous mixture may be had. Then a quantity of phosphoric acid which may vary between the limits of twenty-five per cent (25%) and seventy-five per cent (75%) of the quantity of ferric sulphate used depending upon the condition of the paper stock. A picture printed with my invisible ink is to be developed by the application of heat as by holding a lighted match under it.

If a coating consisting of a solution of yellow prussiate of potassium (ferro cyanid) be applied to the obverse side, a print made with my invisible ink may be developed by immersion in water as well as by heat. A small quantity of gum tragacanth and a still smaller quantity of gum acacia together with pure glycerine as a vehicle may be mixed with the yellow prussiate of potassium.

I claim:—

1. An invisible ink composed of an aqueous solution of ferric sulphate mixed with phosphoric acid.

2. An invisible ink composed of an aqueous solution of basic ferric sulphate mixed with a lesser per cent of phosphoric acid and a still smaller per cent of ferric ammonium sulphate.

3. An invisible ink composed of an aqueous solution of basic ferric sulphate mixed with a quantity of phosphoric acid variable within the limits of twenty-five to seventy-five per cent of the quantity of ferric sulphate.

4. An invisible ink consisting of an aqueous solution of ferric sulphate and phosphoric acid in the proportions of substantially two to one respectively.

Signed by me, this 4th day of November, 1921.

CHARLES F. MORSE.